(12) United States Patent
Kim et al.

(10) Patent No.: US 11,302,311 B2
(45) Date of Patent: Apr. 12, 2022

(54) ARTIFICIAL INTELLIGENCE APPARATUS FOR RECOGNIZING SPEECH OF USER USING PERSONALIZED LANGUAGE MODEL AND METHOD FOR THE SAME

(71) Applicant: LG ELECTRONICS INC., Seoul (KR)

(72) Inventors: Boseop Kim, Seoul (KR); Jaehong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 16/546,924

(22) Filed: Aug. 21, 2019

(65) Prior Publication Data

US 2019/0378495 A1    Dec. 12, 2019

(30) Foreign Application Priority Data

Jul. 23, 2019 (KR) .................. 10-2019-0088686

(51) Int. Cl.
*G10L 15/07* (2013.01)
*G10L 15/02* (2006.01)
(Continued)

(52) U.S. Cl.
CPC .............. *G10L 15/07* (2013.01); *G10L 15/02* (2013.01); *G10L 15/063* (2013.01);
(Continued)

(58) Field of Classification Search
CPC ....... G10L 15/07; G10L 15/02; G10L 15/063; G10L 15/1815; G10L 15/187; G10L 15/22; G10L 2015/025; G10L 2015/0635
See application file for complete search history.

(56) References Cited

U.S. PATENT DOCUMENTS 10,747,957 B2 * 8/2020 Wohlwend ............ G06F 40/284
2015/0332672 A1 * 11/2015 Akbacak ............... G06F 16/637
704/257
(Continued)

FOREIGN PATENT DOCUMENTS

JP      2002229585      8/2002
JP      2012078650      4/2012
(Continued)

OTHER PUBLICATIONS

Cho, et al., "An Intention Prediction Method for Dialogue using Paragraph Vector", Journal of The Korean Institute of Information Scientists and Engineers, pp. 977-979, Jun. 2016, http://www.dbpia.co.kr/journal/articleDetail?nodeId=NODE07017709, 5 pages.
(Continued)

*Primary Examiner* — Michelle M Koeth
(74) *Attorney, Agent, or Firm* — Lee Hong Degerman Kang & Waimey

(57) ABSTRACT

An artificial intelligence apparatus for recognizing speech of a user includes a microphone, and a processor configured to receive, via the microphone, a sound signal corresponding to the speech of the user, acquire personalize identification information corresponding to the speech, recognize the speech from the sound signal using a global language model, calculate a reliability for the recognition, and if the calculated reliability exceeds a predetermined first reference value, update a personalized language model corresponding to the personalize identification information using the recognition result.

11 Claims, 8 Drawing Sheets

(51) Int. Cl.
  *G10L 15/18*  (2013.01)
  *G10L 15/187* (2013.01)
  *G10L 15/06*  (2013.01)
  *G10L 15/22*  (2006.01)

(52) U.S. Cl.
  CPC ........ *G10L 15/187* (2013.01); *G10L 15/1815* (2013.01); *G10L 15/22* (2013.01); *G10L 2015/025* (2013.01); *G10L 2015/0635* (2013.01)

(56) References Cited

U.S. PATENT DOCUMENTS

| | | | |
|---|---|---|---|
| 2018/0286401 A1* | 10/2018 | Oh ........................ | G10L 15/063 |
| 2019/0088251 A1* | 3/2019  | Mun ..................... | G10L 15/187 |
| 2020/0020319 A1* | 1/2020  | Malhotra .............. | G10L 15/063 |
| 2020/0074993 A1* | 3/2020  | Lee ...................... | G10L 15/1822 |
| 2020/0258504 A1* | 8/2020  | Lee ...................... | G10L 15/183 |

FOREIGN PATENT DOCUMENTS

| KR | 20180071931 | 6/2018 |
|----|-------------|--------|
| KR | 20190031785 | 3/2019 |

OTHER PUBLICATIONS

Korean Intellectual Property Office Application Serial No. 10-2019-0088686, Office Action dated Dec. 18, 2020, 7 pages.

* cited by examiner

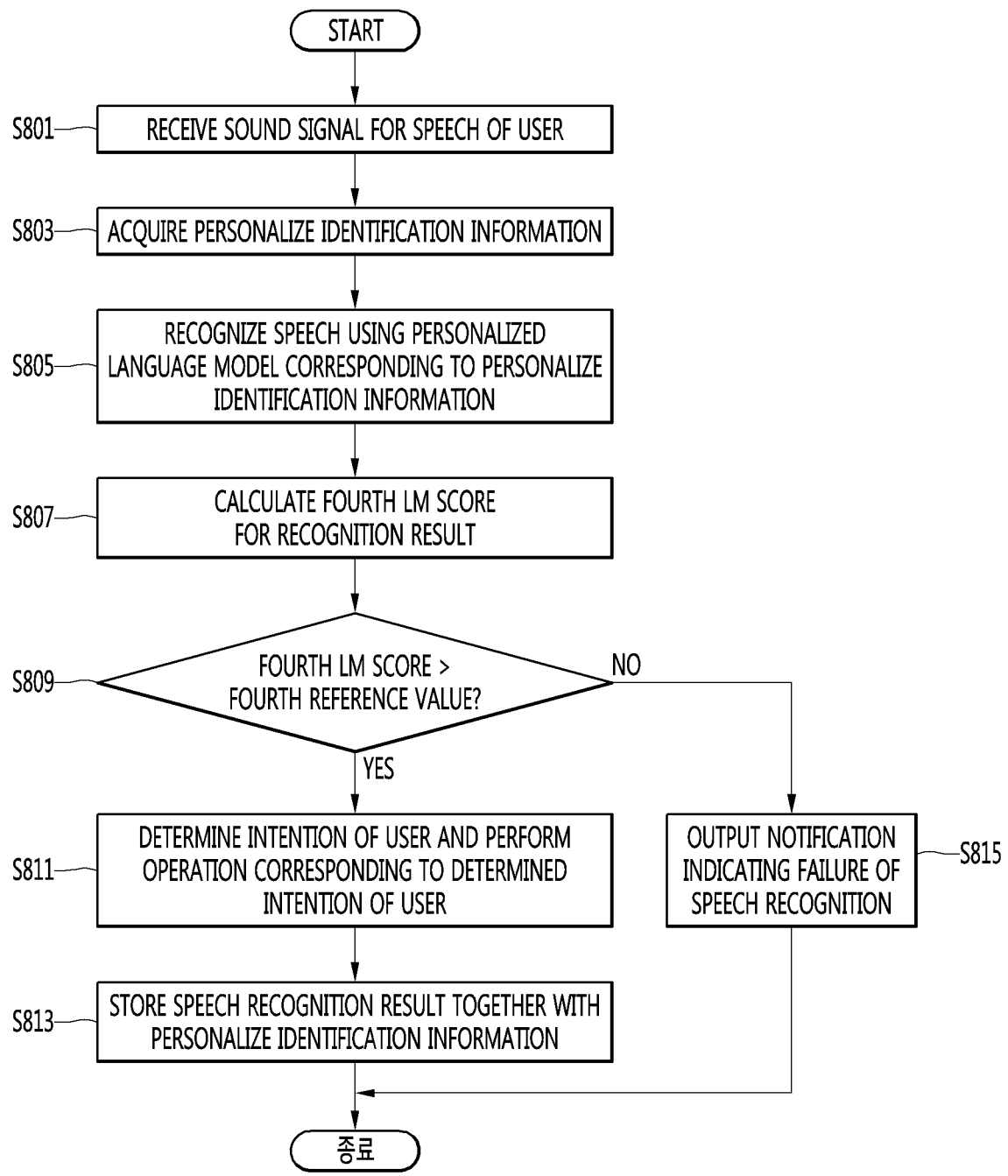

ARTIFICIAL INTELLIGENCE APPARATUS FOR RECOGNIZING SPEECH OF USER USING PERSONALIZED LANGUAGE MODEL AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No. 10-2019-0088686, filed on Jul. 23, 2019, the contents of which are hereby incorporated by reference herein in its entirety.

BACKGROUND

The present invention relates to an artificial intelligence apparatus for recognizing speech of a user using a personalized language model and a method for the same. Specifically, the present invention relates to an artificial intelligence apparatus for constructing a personalized language model using a speech recognition record for each user and more accurately recognizing speech of a user using a personalized language model for each user, and a method for the same.

Recently, the number of devices that interact with users using speech recognition are increasing. A speech recognition technology has been applied to various services such as a speech-to-text (STT) service that simply converts user's speech into text, a service that performs appropriate control or provides a response when the user's speech is input, or the like.

However, when the user's speech is not recognized correctly, these devices will only ask the user to utter again, which causes a user's satisfaction level to drop significantly.

In addition, the speech that has failed to be recognized once is often not recognized correctly even after the reutterance. Here, the user will not use the speech recognition function without explicit feedback, which makes it difficult to improve a performance of the speech recognition function.

SUMMARY

The present invention is directed to provide an artificial intelligence apparatus for recognizing speech of a user using a personalized language model for each user, and a method for the same.

The present invention is also directed to provide an artificial intelligence apparatus for updating a personalized language model corresponding to user identification information by using the user identification information and a speech recognition result for the user, determining which user is currently speaking, and recognizing speech of the user using a personalized language model, and a method for the same.

One embodiment of the present invention provides an artificial intelligence apparatus and method for, if a sound signal corresponding to speech of a user is received, acquiring personalize identification information corresponding to the speed, recognizing the speech of the user using a global language model, if the reliability of the sound recognition exceeds a reference value, updating a personalized language model corresponding to the personalize identification information using the speech recognition result.

In addition, one embodiment of the present invention provides an artificial intelligence apparatus and method for, if the reliability of the speech recognition does not exceed a reference value, extracting a misrecognized word lowering the reliability of the speech recognition from the speech recognition result, and updating the misrecognized word using a personalized language model corresponding to personalize identification information.

In addition, one embodiment of the present invention provides an artificial intelligence apparatus and method for updating a personalized language model corresponding to personalize identification information by increasing a weight of a word included in the speech recognition result.

The details of one or more embodiments are set forth in the accompanying drawings and the description below. Other features will be apparent from the description and drawings, and from the claims.

BRIEF DESCRIPTION OF THE DRAWINGS

FIG. 8 is a flowchart illustrating a method for recognizing speech of a user according to an embodiment of the present invention.

DETAILED DESCRIPTION OF THE EMBODIMENTS

Figure 1:
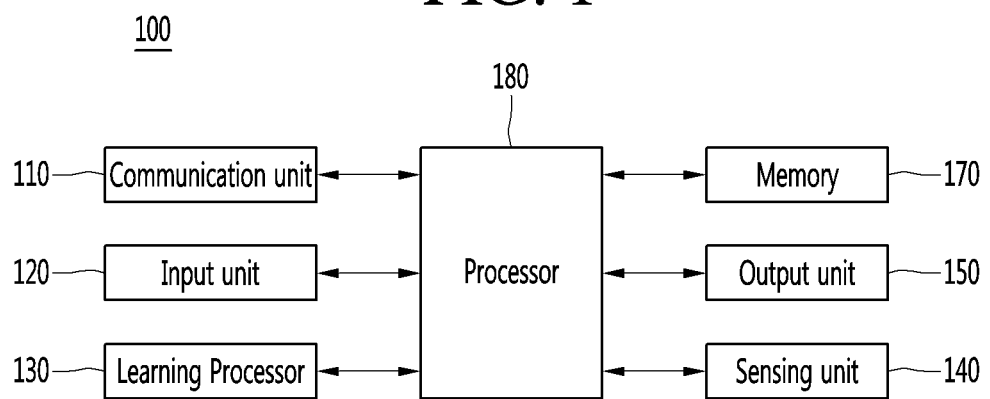
FIG. 1 is a block diagram illustrating an AI apparatus according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other AI apparatuses 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. Here, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
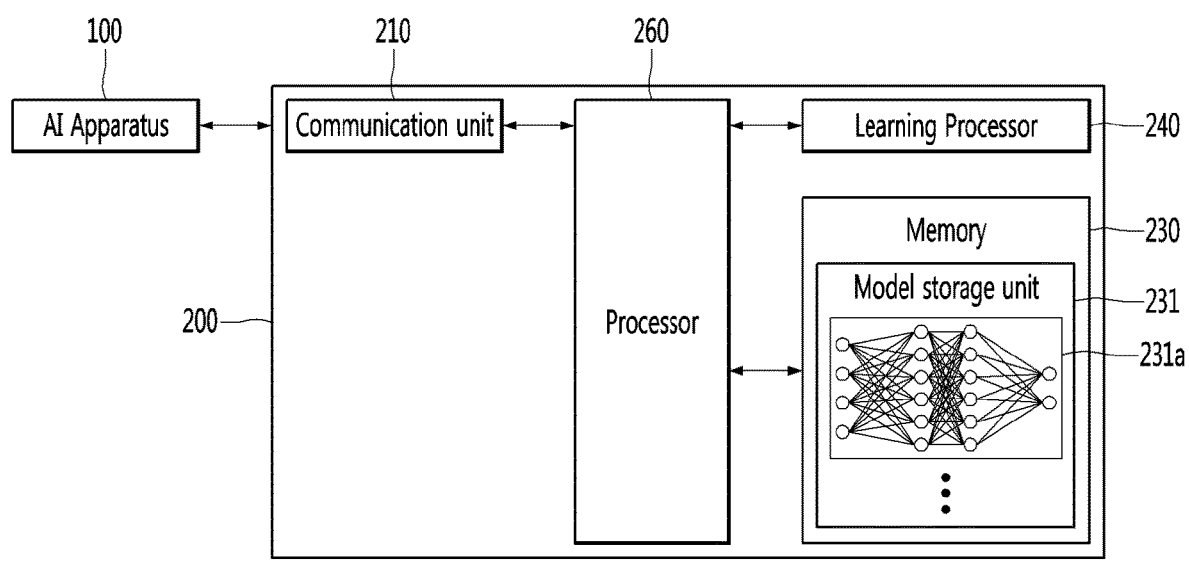
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
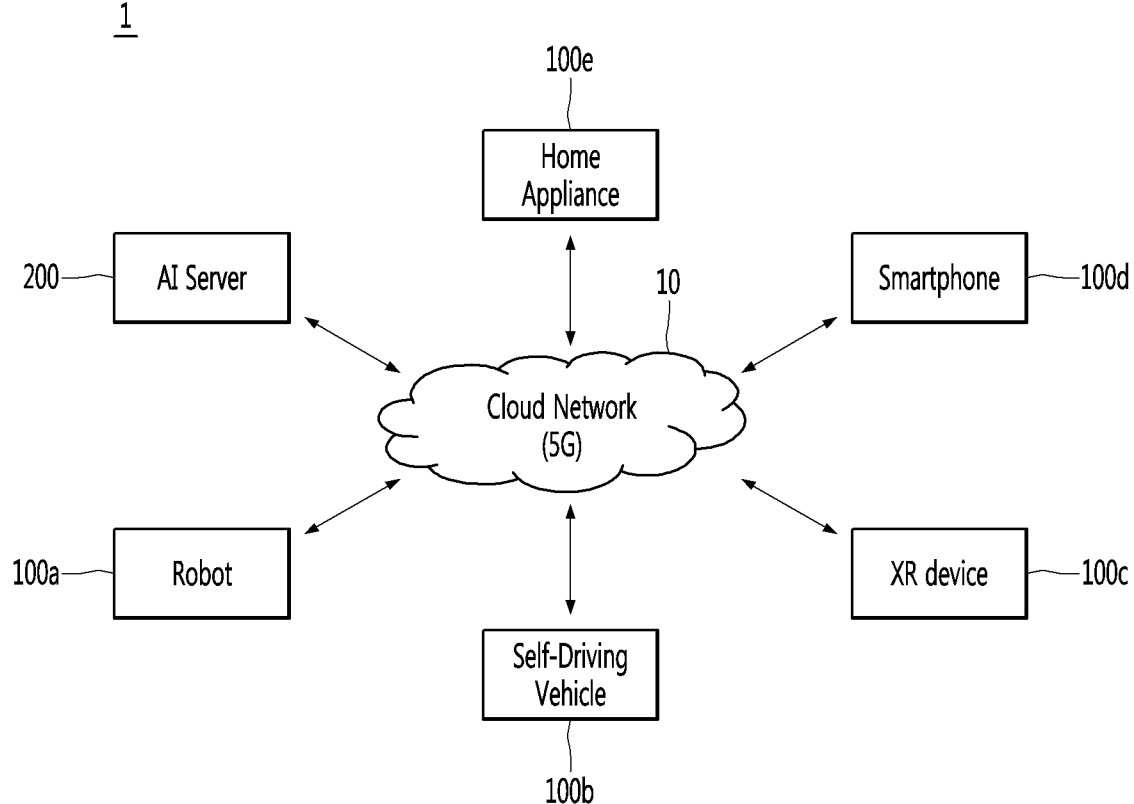
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, or the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. Here, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be output so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
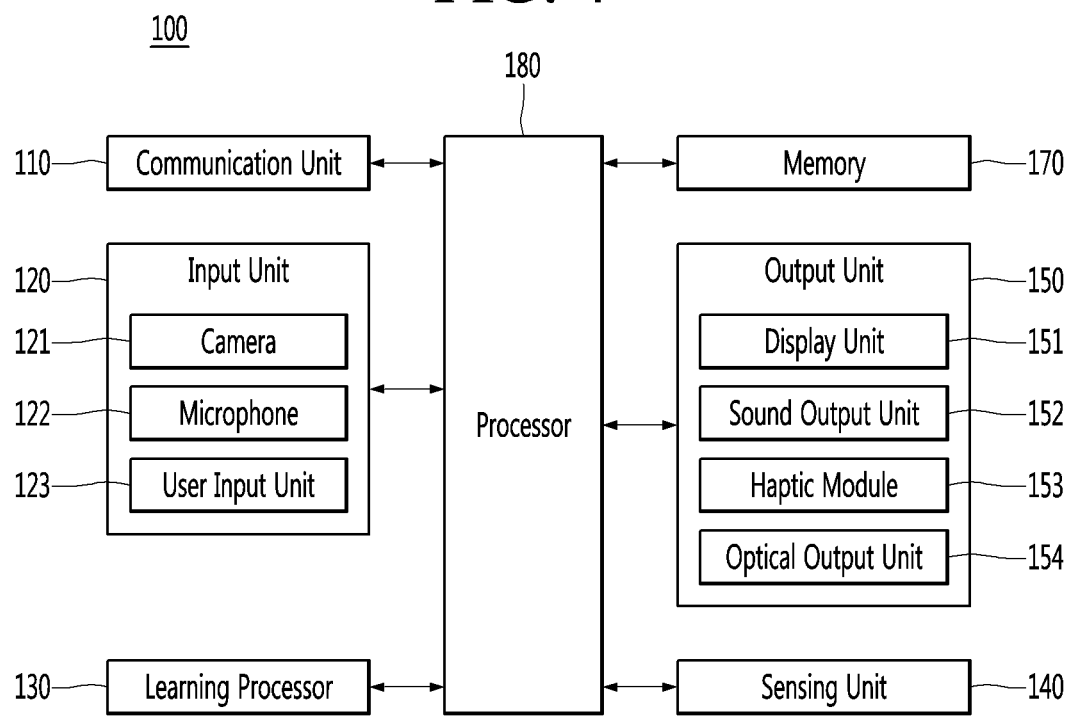
FIG. 4 is a block diagram illustrating an AI apparatuses according to an embodiment of the present invention.

FIG. 4 is a block diagram illustrating an AI apparatus according to an embodiment of the present invention.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information input from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is input through the user input unit 123, the processor 180 may control an operation of the AI apparatus 100 to correspond to the input information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

A sensing unit 140 may be called a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

Figure 5:
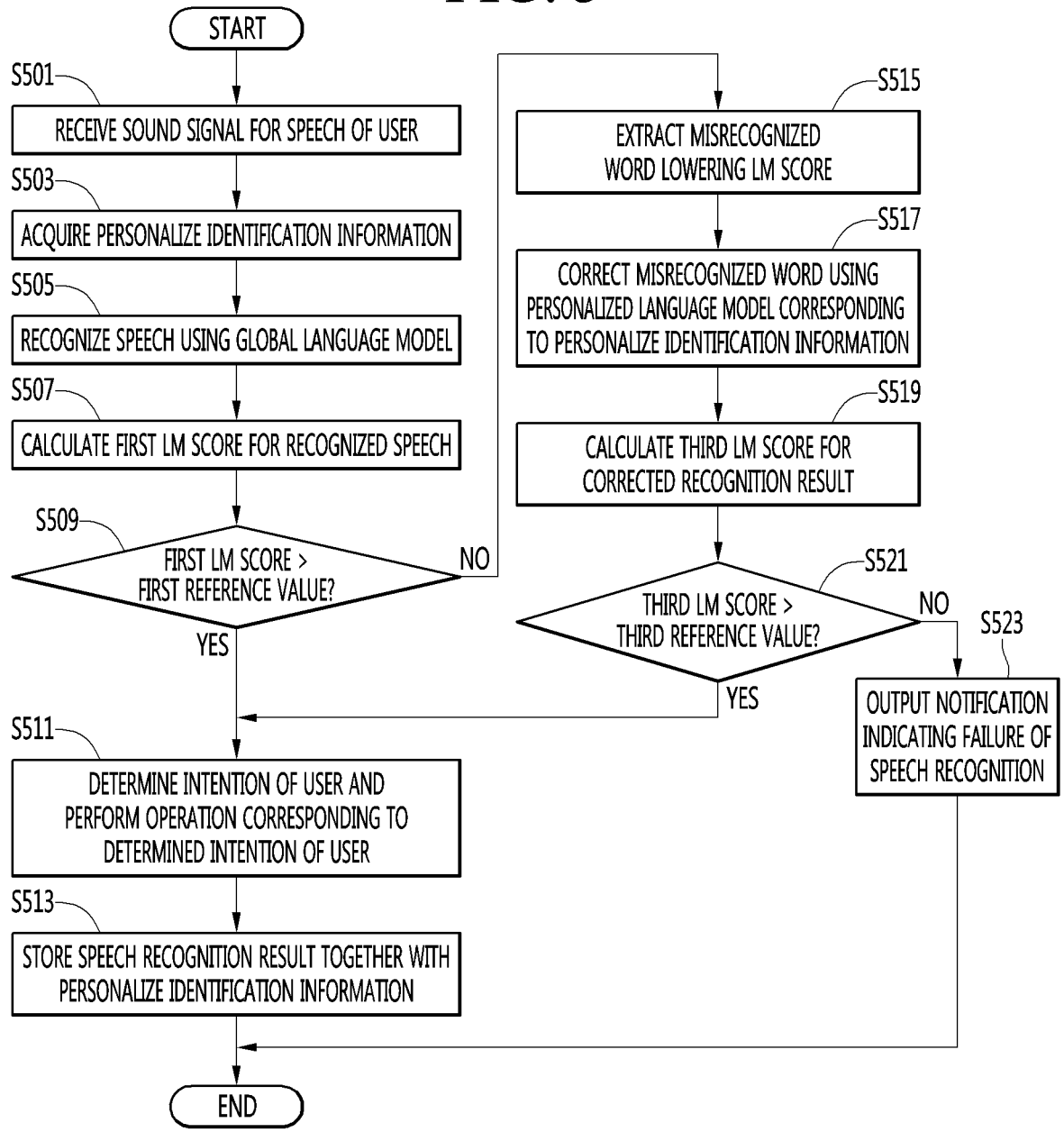
FIG. 5 is a flowchart illustrating a method for recognizing speech of a user according to an embodiment of the present invention.

FIG. 5 is a flowchart illustrating a method for recognizing speech of a user according to an embodiment of the present invention.

Referring to FIG. 5, the processor 180 of the AI apparatus 100 receives a sound signal for the speech of the user (S501).

The sound signal of the user's speech may be received via the microphone 122 of the AI apparatus 100, but may also be received from an external device (not shown) via the communication unit 110.

The sound signal may be an audio file in a pulse code modulation (PCM) format.

The processor 180 of the AI apparatus 100 acquires personalize identification information corresponding to the speech (S503).

The personalize identification information may mean identification information for identifying a user who utters speech or a device used by the user. The personalize identification information may be used to personalize the speech recognition function.

The personalize identification information may include device identification information or user identification information.

The device identification information is identification information for distinguishing the AI apparatus 100 or an external device (not shown), which initially acquires a sound signal for the speech of the user, from other devices, and a unique value may be given to the device identification information for each device.

The user identification information is identification information for distinguishing the user who utters speech from other users, and a unique value may be given to the user identification information for each user.

Here, the processor 180 may determine the user who utters speech through voice analysis on the received sound signal, and may acquire user identification information about the determined user.

Here, when user account information exists, the processor 180 may acquire identification information about the user based on the user account information.

Then, the processor 180 of the AI apparatus 100 recognizes the speech using a global language model (LM) (S505).

Here, the recognizing of the speech may mean generating a text string corresponding to the sound signal. The global language model may mean a language model commonly used for all users.

Hereinafter, unless otherwise specified, the language model refers to both the global language model and the personalized language model described later.

The processor 180 may recognize the input sound signal on a phoneme basis using an acoustic model (AM) and may determine a word corresponding to the input sound signal based on the recognition result on a phoneme basis. The processor 180 may generate a word vector on a phoneme basis using the recognition result on a phoneme basis and determine at least one word corresponding to the input sound signal using the generated word vector on a phoneme basis and the global language model.

The at least one word determined by the processor 180 may include a single word or a word sequence composed of a plurality of words.

The language model may refer to a model that represents a probability distribution for the word sequence. That is, when a specific word sequence is given, the language model may output a probability that the word sequence appears. Thus, the processor 180 may use the language model to determine candidate words suitable for a next word when a specific word sequence is given or to calculate a probability that each candidate word appears.

For example, it is assumed that the processor 180 recognizes phonemes of a specific recognition target word as ['n', 'i', 'g', 'h', 't',] using the acoustic model. The processor 180 may generate a word vector on a phoneme basis corresponding to the ['n', 'i', 'g', 'h', 't',] and determine the recognition target word using the generated word vector and the language model. When the language model is used, and when it is determined that the recognition target word is more likely to be a "knight" than a "night" in view of the word sequence recognized so far, the processor 180 may determine the target word to be the "knight" rather than the "night", unlike the result of the acoustic model.

Although the above example describes a situation where only a single word is determined, the present invention is not limited thereto. That is, the processor 180 may determine a single word using word vectors on a phoneme basis estimated to be a plurality of words, or conversely, determine a plurality of words using a word vector on a phoneme basis estimated to be a single word.

For example, even when the recognition result on a phoneme basis from the acoustic model indicates a single word "foreign", the recognition target word may be determined as a plurality of words "for him". On the contrary, even when the recognition result on a phoneme basis from the acoustic model indicates the plurality of words "for him", the recognition target word may be determined as the single word "foreign" based on the determination result of the language model.

Each of the acoustic model or the language model described above may be a model learned using a machine learning algorithm or a deep learning algorithm, and may be configured as an artificial neural network. Learning of the acoustic model or the language model may be performed in the learning processor 130 of the AI apparatus 100 or in the learning processor 240 of the AI server 200.

The acoustic model or the language model may be stored in the memory 170 of the AI apparatus 100 or may be stored in the memory 230 of the AI server 200.

The processor 180 of the AI apparatus 100 calculates a first language model (LM) score for the recognized speech (S507).

The LM score may mean how likely to generate the speech recognized by the language model or how reliable the language model recognizes the speech. In other words, calculating the LM score can be understood as calculating the reliability or accuracy of speech recognition.

The first LM score may mean an LM score for the entire recognized speech.

Here, the processor 180 may calculate the first LM score for the recognized speech using the global language model.

The processor 180 of the AI apparatus 100 determines whether the calculated first LM score exceeds a predetermined first reference value (S509).

If the calculated first LM score exceeds the predetermined first reference value, it may mean that the speech of the user is recognized with high accuracy/reliability even when using the global language model.

If it is determined in operation S509 that the calculated first LM score exceeds the predetermined first reference value, the processor 180 of the AI apparatus 100 determines the intention of the user based on the speech recognition result and performs an operation corresponding to the determined intention of the user (S511).

The determining of the intention of the user may mean recognizing the intention of the user. Further, the determining of the intention corresponding to the user's speech may mean determining the intention of the natural language corresponding to the speech. Further, the intention of the user may mean an intention corresponding to the user's speech.

The processor 180 may determine the intention of the user by generating the intention information based on the speech recognition result.

Here, the processor 180 may determine the intention of the user using an intention classifier of a natural language understanding (NLU) technique.

The intention classifier may refer to a model which projects an intention of the input speech recognition result onto a vector space, when the speech recognition result is input.

Here, a cluster may be formed for each intention in the vector space resulted from an output of the intention classifier. That is, there may be a plurality of intention clusters that may be classified by the intention classifier in the vector space resulted from the output of the intention classifier.

Here, if the speech recognition result is input to the intention classifier, the more the intention of the input speech recognition result and a specific intention cluster are similar, the intention classifier may project the input speech recognition result to a location adjacent to the corresponding intention cluster. Therefore, a distance between the projected location and each intention cluster means a similarity between the intention of the input speech recognition result and each intention cluster. Thus, a short distance may mean a high degree of the similarity.

Here, the intention classifier may be an artificial neural network-based model learned using the machine learning algorithm or the deep learning algorithm.

The processor 180 may determine the intention of the user using the distance from the position where the input speech recognition result is projected in the vector space to the nearest intention cluster. Hereinafter, the intention cluster nearest from the position where the input speech recognition result is projected may be referred to as a closest intention cluster or a first intention cluster.

The processor 180 may determine an intention corresponding to the first intention cluster as the intention of the user, and perform an operation corresponding to the determined intention.

For example, if the intention of the user requires information about a specific subject, the processor 180 may output information about the subject through the sound output module 152 or the display unit 151.

The processor 180 of the artificial intelligence device 100 stores the speech recognition result together with the personalize identification information (S513).

The processor 180 may store the speech recognition result in the memory 170 together with the personalize identification information.

Here, the speech recognition result may be stored in the memory 170 by adding personalize identification information as a tag or a label.

The stored speech recognition result may be used to generate or update the personalized language model.

The personalized language model may mean a language model that is divided for each personalize identification information, and may be classified by user or device.

In addition, the personalized language model may mean an individual language model divided by user or device, and may mean a global language model using a personalized mapping model that receives a result of the global language model and outputs a personalized result based on the mapping relationship of the personalized vocabulary. That is, in the latter case, the personalized language model refers to both the global language model and the personalized mapping model, and the personalized mapping model provides a speech recognition function specialized for each user or device.

Hereinafter, unless otherwise specified, the personalized language model may refer to both the individual language model and the personalized mapping model that are distinguished from the global language model.

The processor 180 may update the personalized language model or the personalized mapping model using the stored speech recognition result with respect to the personalized language model or the personalized mapping model corresponding to the stored personalize identification information.

In detail, the processor 180 may update the personalized language model by learning an encoding module that generates a word vector from a personalize vector representing personalize identification information and phonemes recognized in the acoustic model. Here, the learned encoding module may mean a personalized language model.

Here, the encoding module may generate a word vector by encoding words by dividing the phonemes recognized from the acoustic model into phonetic symbol units (for example, initial consonant, middle consonant, and final consonant).

The personalize vector may be configured in the form of an actual vector, but may also be configured in the form of a matrix. For example, the personalize vector may be composed of a word vector matrix.

The personalize vector is set differently for each user or each device, and the same personalize vector is not used between different users or devices. On the other hand, the word vector corresponding to the word is set identically between different users or devices, and the same word vector is used without distinguishing between users and devices.

If a specific word is repeatedly recognized for a specific personalize vector, the processor 180 may set a higher weight for the word for the personalized language model corresponding to the personalize vector.

In the personalized language model, a high weight for a specific word may mean that the word is used frequently or is more likely to be included in a sentence.

That is, the processor 180 may generate and maintain a language model in consideration of the language usage pattern of the user by setting a word mapping relationship or adjusting a weight in the personalized language model.

Setting the mapping relationship or adjusting the weight in the personalized language model may mean word embedding learning.

When it is determined in operation S509 that the calculated first LM score does not exceed a predetermined first reference value, the processor 180 of the AI apparatus 100 extract a misrecognized word lowering the first LM score from the speech recognition result (S515).

The misrecognized word lowering the first LM score may include a word sequence composed of a plurality of words as well as a single word.

Hereinafter, unless otherwise specified, the term "word" may refer to both the single word and the word sequence composed of the plurality of words.

The processor 180 may calculate a second LM score for each word constituting the speech recognition result, and extract a word having the lowest second LM score as a misrecognized word. Alternatively, the processor 180 may extract all the words whose second LM score is lower than the predetermined second reference value as the misrecognized word.

For example, a word having a bad pronunciation or a word including noise may be determined and extracted as the misrecognized word.

The processor 180 of the AI apparatus 100 corrects the misrecognized word using the personalized language model corresponding to the personalize identification information (S517).

The processor 180 newly recognizes a misrecognized word recognized by the global language model with low reliability by using the personalized language model corresponding to the personalize identification information. That is, the processor 180 may correct the misrecognized word by re-recognizing the word recognized with the low LM score in the global language model using the personalized language model.

Alternatively, the processor 180 may calculate a similarity between the misrecognized word and the personalize vector. When the similarity exceeds a predetermined reference value or threshold, the processor 180 may correct the misrecognized word by replacing the misrecognized word with the most similar word in the lexicon based on the similarity of the word vector.

The processor 180 of the AI apparatus 100 calculates a third LM score with respect to the corrected recognition result (S519).

The third LM score may mean an LM score of the entire corrected recognition result.

Here, the processor 180 may calculate a third LM score for the corrected recognition result using the personalized language model corresponding to the personalize identification information.

The processor 180 of the AI apparatus 100 determines whether the calculated third LM score exceeds a predetermined third reference value (S521).

If the calculated third LM score exceeds the predetermined third reference value, it may mean that the word having been inaccurately recognized by the global language model is recognized with high accuracy/reliability through the personalized language model.

When it is determined in operation S521 that the calculated third LM score exceeds the predetermined third reference value, the processor 180 of the AI apparatus 100 determines the intention of the user and proceeds to operation S511 of performing an operation corresponding to the determined intention of the user.

That is, if the calculated third LM score exceeds the preset third reference value, it may be determined that the speech of the user has been recognized with high reliability using the personalized language model. Thus, the processor 180 may determine the intention of the user based on the speech recognition result and perform an operation corresponding to the intention.

When it is determined in operation S521 that the calculated third LM score does not exceed the predetermined third reference value, the processor 180 of the AI apparatus 100 outputs a notification indicating that the speech recognition has failed (S523).

The notification indicating that the speech recognition has failed may include at least one of a speech recognition failure notification or a re-input request.

The processor 180 may output the notification indicating that the speech recognition has failed, as an image through the display unit 151, as a sound through the sound output module, or as an image and a sound by using the display unit 151 and the sound output module 152 simultaneously.

Alternatively, the processor 180 may transmit an output control signal or an output request signal to the external device through the communication unit 110 so that the external device outputs the notification indicating that the speech recognition has failed.

For example, the processor 180 may request re-input by outputting "Please utter speech again" through the sound output module 152, may notify the failure of the speech recognition by outputting "I didn't get it", and may request re-input while notifying the failure of the speech recognition by outputting "I didn't get it. Please utter speech again."

Figure 6:
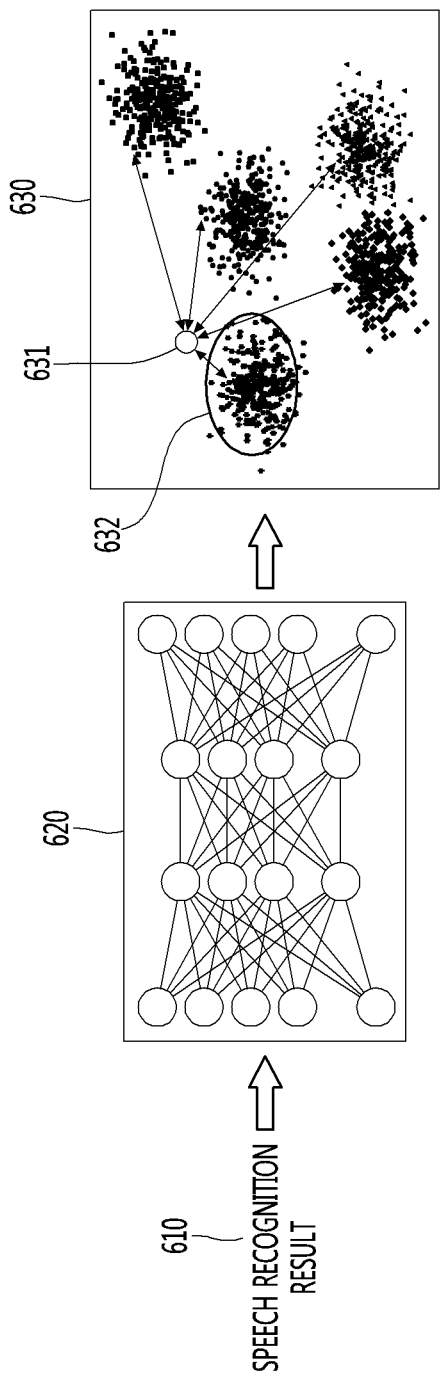
FIG. 6 is a view illustrating a method for determining intension of a user according to an embodiment of the present invention.

FIG. 6 is a view illustrating a method for determining intension of a user according to an embodiment of the present invention.

Referring to FIG. 6, the processor 180 of the AI apparatus 100 may determine the intention of the user from the speech recognition result 610 using an intention classifier 620 of a natural language understanding (NLU) technique.

As described above, if the speech recognition result is input, the intention classifier 620 may project the intention from the speech recognition result 610 input onto a vector space 630. Further, a plurality of intention clusters that may be classified by the intention classifier 620 may exist in the vector space 630.

If the speech recognition result 610 is projected onto the vector space 630 using the intention classifier 620, the processor 180 may grasp the first intention cluster 632 nearest to the projected position 631 among the plurality of intention clusters in the vector space 630. The processor 180 may determine an intention corresponding to the first intention cluster 632 nearest to the projected position 631 as the intention of the user.

Figure 7:
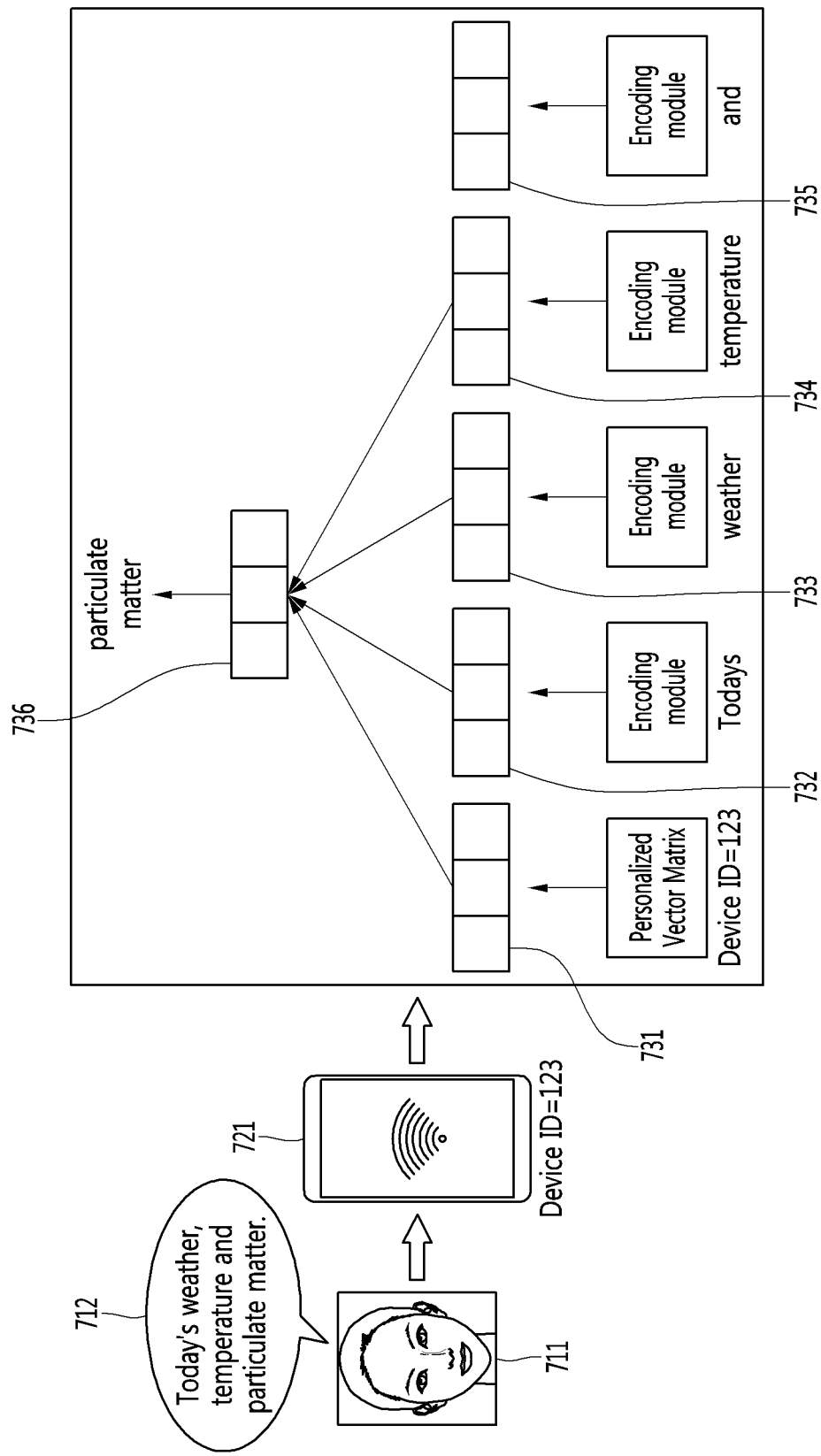
FIG. 7 is a view illustrating a method for recognizing speech of a user using a personalized language model according to an embodiment of the present invention.

FIG. 7 is a view illustrating a method for recognizing speech of a user using a personalized language model according to an embodiment of the present invention.

Referring to FIG. 7, when the user 711 utters speech 712 asking for today's weather, temperature and particulate matter, the AI apparatus 721 receives the speech 712 of the user 711.

The AI apparatus 721 may include a device ID. For example, the device identifier of the AI apparatus 721 may be "123".

The processor 180 of the AI apparatus 721 may recognize the speech 712 of the user 711 using the personalized language model.

Specifically, FIG. 7 illustrates a situation in which the actual speech 712 of the user 711 is "Today's weather, temperature and particulate matter.", but it is difficult to identify the words "particulate matter" due to noise or inaccurate pronunciation. It is assumed that the user 711 is a person who has often requested information about particulate matter.

When the processor 180 of the AI apparatus 721 recognizes the speech 712 using the global language model, the processor 180 may recognize the existence of the word "particulate matter" that is inaccurately recognized or fails to be recognized. Accordingly, the personalized language model may be used to attempt to recognize the speech 712.

For example, the result obtained when the processor 180 of the AI apparatus 721 recognizes the speech 712 using the global language model may be "Today's weather, temperature, and particular manner." The LM score corresponding to the "particular manner" may appear to be low.

When the personalize vector 731 and the word vectors 732, 733, 734, and 735 for each word successfully recognized are input, the personalized language model may output the word vector 736 as the recognition result considering the speech record or speech pattern of the user 711. The output word vector 736 may be a word vector corresponding to "particulate matter" in light of the usual speech pattern or speech record of the user 711.

Accordingly, when the speech 712 of the user is misrecognized as "Today's weather, temperature, and particular manner" according to the global language model, the processor 180 may correct the misrecognized word "particular manner" to "particulate matter" based on the personalize vector 731, and may accurately recognize the speech 712 of the user as "Today's weather, temperature and particulate matter."

When the speech 712 of the user 711 includes noise or inaccurate pronunciation, there is a problem that the speech 712 cannot be accurately recognized when the general language model (global language model) is used. However, the personalized language model is generated and updated considering information about frequently used words or vocabulary based on usage history by user or device, and the recognition of the speech 712 is attempted using the personalized language model when the accurate recognition fails with the global language model, thereby recognizing the speech with higher accuracy.

In another embodiment, the processor 180 of the AI apparatus 721 may recognize the speech 712 using the personalized language model, instead of using the global language model.

FIG. 8 is a flowchart illustrating a method for recognizing speech of a user according to an embodiment of the present invention.

The description overlapping that of FIG. 5 will be omitted.

Referring to FIG. 8, the processor 180 of the AI apparatus 100 receives a sound signal for speech of a user (S801).

Operation S801 corresponds to operation S501 of FIG. 5.

The processor 180 of the AI apparatus 100 acquires personalize identification information (S803).

Operation S803 corresponds to operation S503 of FIG. 5.

The processor 180 of the AI apparatus 100 recognizes the speech using a personalized language model (LM) corresponding to the personalize identification information (S805).

Unlike in FIG. 5, the processor 180 may recognize an input sound signal on a phoneme basis using a sound model, and determine a word corresponding to the input sound signal based on the recognition result on the phoneme basis. The processor 180 may generate a phoneme-based word vector using the recognition result on the phoneme basis, and determine at least one word corresponding to the input sound signal using the personalized language model corresponding to the generated phoneme-based word vector and the personalize identification information.

In other words, the processor 180 may recognize the speech of the user by directly using the personalized language model corresponding to the personalize identification information, without using the global language model.

Since the personalized language model is the same as described above, a redundant description thereof is omitted.

The processor 180 of the AI apparatus 100 calculates a fourth LM score for the recognition result (S807).

The fourth LM score may mean an LM score for the entire recognition result.

Here, the processor 180 may calculate the fourth LM score for the recognition result by using the personalized language model corresponding to the personalize identification information.

The processor 180 of the AI apparatus 100 determines whether the calculated fourth LM score exceeds a predetermined fourth reference value (S809).

If the calculated fourth LM score exceeds the predetermined fourth reference value, it may mean that the speech of the user is recognized with high accuracy/reliability through the personalized language model.

When it is determined in operation S809 that the calculated fourth LM score exceeds the predetermined third reference value, the processor 180 of the AI apparatus 100 determines the intention of the user based on the speech recognition result, and may perform an operation corresponding to the determined intention of the user (S811).

Operation S811 corresponds to operation S511 of FIG. 5.

The processor 180 of the AI apparatus 100 stores the speech recognition result together with the personalize identification information (S813).

Operation S813 corresponds to operation S513 of FIG. 5.

When it is determined in operation S809 that the calculated fourth LM score does not exceed the predetermined fourth reference value, the processor 180 of the AI apparatus 100 outputs a notification indicating that the speech recognition has failed (S815).

Operation S815 corresponds to operation S523 of FIG. 5.

According to various embodiments of the present disclosure, even if the user unambiguously pronounces or a noise is included in a sound signal, the speech of the user may be recognized more accurately in consideration of the user speech recording or speech pattern.

In addition, according to various embodiments of the present invention, as the speech of the user is recognized using the personalized language model, it can be recognized suitably for the speech habit of each user.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence apparatus for recognizing speech of a user, comprising:
  a microphone; and
  a processor configured to:
    receive, via the microphone, a sound signal corresponding to the speech of the user;
    acquire personalize identification information corresponding to the speech;
    recognize the speech from the sound signal using a global language model;
    determine a reliability for the speech recognition result;
    based on the determined reliability exceeding a predetermined first reference value, update a personalized language model corresponding to the personalize identification information using the speech recognition result;
    determine a first language model (LM) score corresponding to the speech recognition result for recognition reliability; and
    based on the determined reliability not exceeding the predetermined first reference value, extract a misrecognized word lowering the first LM score from the speech recognition result and correct the misrecognized word using the personalized language model corresponding to the personalize identification information, and determine a similarity between the extracted misrecognized word and a personalize vector representing the personalize identification information, based on the determined similarity exceeding a predetermined threshold, determine a word most similar to the misrecognized word in a lexicon, and correct the speech recognition results by replacing the misrecognized word in the speech recognition result with the most similar word.

2. The artificial intelligence apparatus according to claim 1, wherein the personalized language model is a language model configured to generate a word vector from the personalize vector and phonemes recognized in an acoustic model, and wherein the processor is further configured to update the personalized language model corresponding to the personalize identification information by increasing a weight of a word included in the speech recognition result.

3. The artificial intelligence apparatus according to claim 1, wherein the processor is further configured to:
determine a second LM score for each word in the speech recognition result; and
extract words for which the second LM score does not exceed a predetermined second reference value as the misrecognized word.

4. The artificial intelligence apparatus according to claim 1, wherein the processor is further configured to:
determine a third LM score with respect to the corrected recognition result; and
based on the determined third LM score exceeding a predetermined third reference value, determine that the speech recognition result is successful, and update the personalized language model corresponding to the personalize identification information using the corrected recognition result.

5. The artificial intelligence apparatus according to claim 1, wherein the processor is further configured to:
based on the determined reliability exceeding the first reference value, determine an intention corresponding to the speech recognition result; and
perform an operation corresponding to the determined intention.

6. The artificial intelligence apparatus according to claim 5, wherein the processor is further configured to:
project the speech recognition result in a vector space using an intention classifier; and
determine the intention of the user by comparing a position of the projected speech recognition result with positions of a plurality of intention groups included in the vector space.

7. The artificial intelligence apparatus according to claim 6, wherein the processor is further configured to determine the intention of the user as an intention corresponding to a nearest intention group nearest from the position of the projected speech recognition result among the plurality of intention groups.

8. The artificial intelligence apparatus according to claim 1, wherein the personalize identification information includes at least one of user identification information for distinguishing each user or device identification information for distinguishing each device, the user identification information is information indicating a user identified according to voice analysis of the speech, and the device identification information is information indicating a device that has received the speech.

9. The artificial intelligence apparatus according to claim 1, wherein the global language model and the personalized language model are a model learned using a machine learning algorithm or a deep learning algorithm, and configured as an artificial neural network.

10. A method for recognizing speech of a user, comprising:
receiving a sound signal corresponding to speech of the user;
acquiring personalize identification information corresponding to the speech;
recognizing the speech from the sound signal using a global language model;
determining reliability of the speech recognition result;
based on the determined reliability exceeding a predetermined first reference value, updating a personalized language model corresponding to the personalize identification information using the speech recognition result;
determining a first language model (LM) score corresponding to the speech recognition result for recognition reliability; and
based on the determined reliability not exceeding the predetermined first reference value,
extract a misrecognized word lowering the first LM score from the speech recognition result and correct the misrecognized word using the personalized language model corresponding to the personalize identification information; and
determine a similarity between the extracted misrecognized word and a personalize vector representing the personalize identification information,
based on the determined similarity exceeding a predetermined threshold, determine a word most similar to the misrecognized word in a lexicon, and
correct the speech recognition result by replacing the misrecognized word in the speech recognition result with the most similar word.

11. A non-transitory recording medium having recorded thereon a program for performing a method for recognizing speech of a user, the method comprising:
receiving a sound signal corresponding to speech of the user;
acquiring personalize identification information corresponding to the speech;
recognizing the speech from the sound signal using a global language model;
determining reliability of the speech recognition result;
based on the determined reliability exceeding a predetermined first reference value, updating a personalized language model corresponding to the personalize identification information using the speech recognition result;
determine a first language model (LM) score corresponding to the speech recognition result for recognition reliability; and
based on the determined reliability not exceeding the predetermined first reference value,
extracting a misrecognized word lowering the first LM score from the speech recognition result and correct the misrecognized word using the personalized language model corresponding to the personalize identification information, and
determining a similarity between the extracted misrecognized word and a personalize vector representing the personalize identification information,
based on the determined similarity exceeding a predetermined threshold, determining a word most similar to the misrecognized word in a lexicon, and
correct the speech recognition result by replacing the misrecognized word in the speech recognition result with the most similar word.

* * * * *